United States Patent Office 3,507,847
Patented Apr. 21, 1970

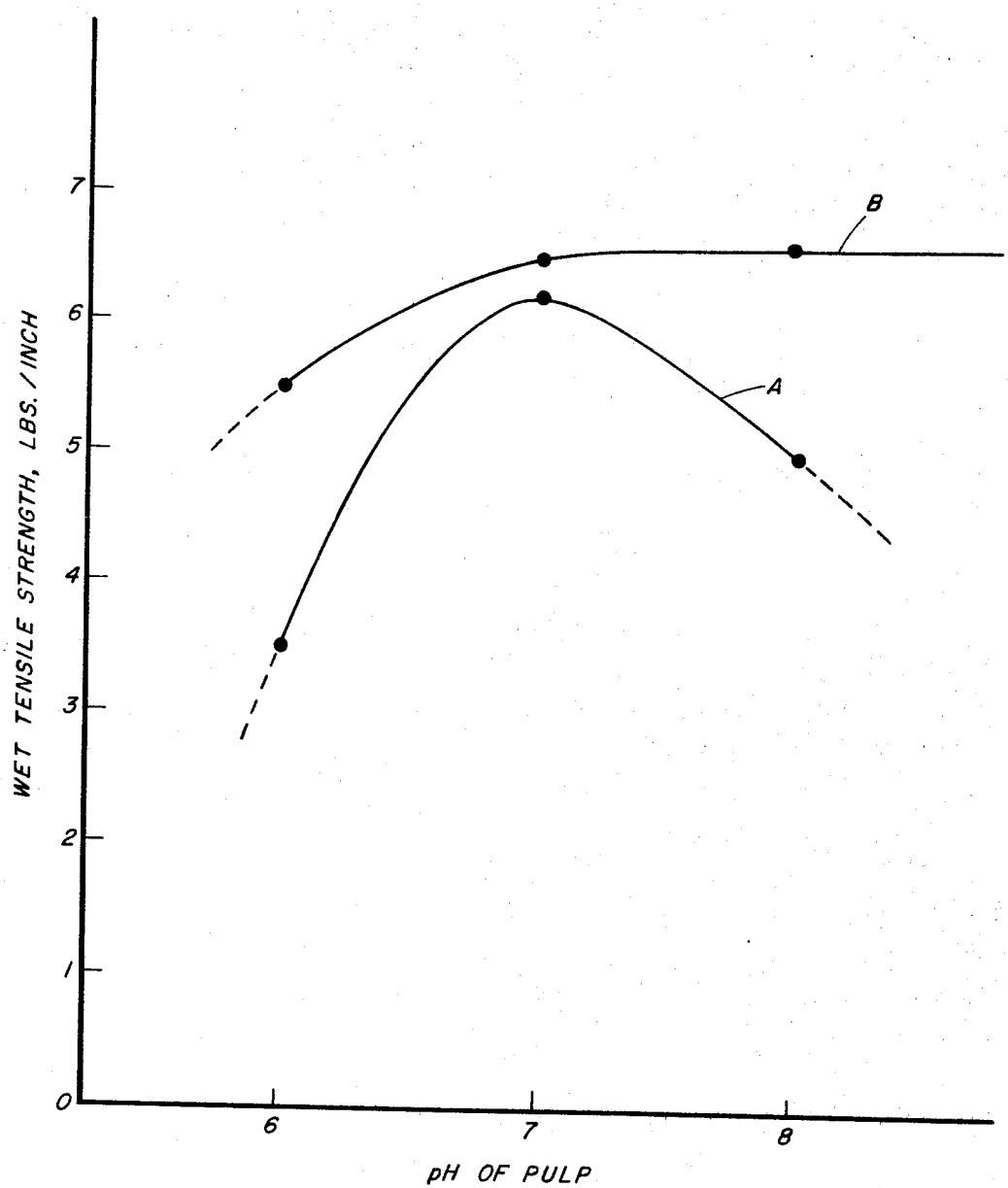

3,507,847
POLYACRYLAMIDE-BASED WET - STRENGTH RESIN AND PAPER HAVING A CONTENT THEREOF
Laurence Lyman Williams, Stamford, and Anthony Thomas Coscia, South Norwalk, Conn., assignors to American Cyanamid Company, Stamford, Conn., a corporation of Maine
Filed Apr. 6, 1967, Ser. No. 628,979
Int. Cl. C08f 3/90
U.S. Cl. 260—89.7       10 Claims

ABSTRACT OF THE DISCLOSURE

A diamine is reacted with sufficient of a water-soluble polyacrylamide in anhydrous or aqueous medium to form a polymer which is water-soluble, cationic and thermosetting. The polymer is hydrolysis-resistant and is a wet-strengthening agent useful in the manufacture of paper.

---

The present invention relates to a novel water-soluble hydrolysis-resistant cationic vinyl polymer carrying basic amino and amide substituents, to methods of preparing said polymer, and to wet-strength paper composed of fibers bonded together by a content of said polymer.

Water-soluble cationic vinyl polymers are known which carry basic amino substituents; cf. House et al., U.S. Patent No. 2,729,560, Moore, U.S. Patent No. 3,012,912, Klein et al., U.S. Patent No. 3,069,390, and Sheets et al., U.S. Patent No. 3,255,072. These polymers provide less wet strength than could be desired, or are not hydrolysis-resistant or storage-stable.

The discovery has now been made that the water-soluble cationic polymer which consists essentially of water-soluble chains which are 20 to 90 mol percent composed of N-unsubstituted acrylamide linkages and 80 to 10 mol percent of cationic N-substituted acrylamide linkages of the theoretical formula (I)

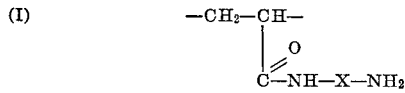

wherein X represents a non-anionic linkage containing 2 to 10 carbon atoms, sets rapidly to water-insoluble state when heated at paper-drying temperatures and at neutral and alkaline pH values (particularly when modified by reaction with epichlorohydrin), possesses very satisfactory wet-strengthening properties in paper, and yet is storage-stable in aqueous acidic and dry alkaline state.

We have further found that this polymer can be manufactured merely by heating polyacrylamide with any of the common water-soluble di- or polyamines.

The polymer of the present invention, in preferred embodiments, possesses the following advantageous properties:

(1) The polymer possesses very satisfactory wet strengthening properties when of low (e.g., 5,000–500,000) molecular weight. Aqueous solutions of the polymer which contain a high percentage of polymer solids are thus of pumpable viscosity. Moreover, in such solutions the polymer is stable for long periods of time at acidic pH values, showing very satisfactory resistance to hydrolysis and to gelation by cross-linking. As a result, it is practical to ship the polymer of the present invention in tank cars or trucks over long distances. The polymer becomes ready for use when rendered alkaline by addition of any customary base.

(2) The polymer can be recovered in dry free-flowing particulate form from aqueous alkaline solution. The resulting powder is a free base which is almost instantly soluble in cold water and which loses none of its valuable properties as the result of its dehydration. The powder is storage-stable. It thus is a most efficient material to ship and to prepare for use. An aqueous syrup of this powder at high solids content is an adhesive for porous solids.

(3) The polymer acts as anchor agent for hydrophobic organic topcoat material on regenerated cellulose film, on oxidized polyethylene film, and on oxidized polypropylene film. It also acts as flocculating agents for colloidal and colloidal organic and inorganic particles in aqueous suspension (e.g., sewage, mine effluent, etc.).

(4) The polymer reacts readily with one of the functionalities of epichlorohydrin. The product of such reaction develops its wet strength over a broad alkaline pH range and (particularly when of lower molecular weight) develops more wet strength per unit weight.

The reason why the polymer of the present invention thermosets so quickly and provides such high wet strength is not known. It is believed, however, that basic amino ($—NH_2$) substituents of one macromolecule condense with amide ($—CONH_2$) substituents of another macromolecule forming cross-linkages according to the following theoretical equation, wherein the radicals designated X are the same as those designated X in Formula I.

(II)

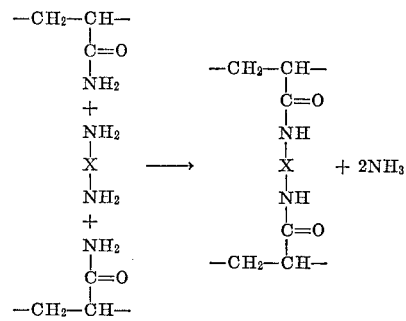

and that the improvement is wholly or at least in significant part ascribable to these cross-linkages.

The evolution of ammonia can be detected during the thermosetting reaction.

In the linkage shown at (I) above, X represents non-ionic groups for example $—CH_2CH_2—$, $—CH_2CH_2CH_2—$, $—CH(CH_3)CH_2—$, $—(CH_2)_4—$, $—CH_2CH(OH)CH_2—$, $—(CH_2)_3—O—(CH_2)_3—$, $—(CH_2)_3—S—(CH_2)_3—$, and $(CH_2)_3—O—CH_2CH_2—O—(CH_2)_3$, as well as cationic groups for example $—CH_2CH_2NHCH_2CH_2—$, and $—(CH_2CH_2NH)_{1-4}CH_2CH_2—$. The cationic groups may result from reaction of the parent polyacrylamide with ethylenediamine, trimethylenediamine, propylenediamine, hexamethylenediamine, 1,3 - diamino - 2 - propanol, diglycolamine, diethylenetriamine, and tetraethylenepentamine.

The polymer of the present invention may be prepared by subjecting polyacrylamide or an acrylamide copolymer such as is more particularly described herein to transamidation with an appropriate polyamine (or mixture of polyamines) so as, in effect, to replace one of the amide hydrogen atoms of the parent polyacrylamide with an $—X—NH_2$ substituent, as is illustrated by the theoretical reaction (III)

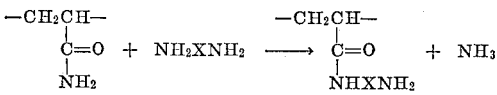

This transamidation may be performed by heating an aqueous solution of the parent polyacrylamide and a stoichiometric excess of a polyamine (or mixture of polyamines) at an alkaline pH. Samples are removed from time to time. The reaction is halted before the polymer has gelled and after the polymer has become cationic and thermosetting. Preferably, from the point of view of wet-strength and storage-stability, the reaction is stopped shortly after the polymer has become thermosetting. The cationic strength of the polymer is readily determined by use of a cataphoresis cell. Whether or not the polymer is thermosetting is readily determined by evaporating a solution of the polymer on a glass plate to form a film of the polymer, heating the plate at 100° C. for 5 minutes, and applying water to the film. Failure of the film to dissolve shows that the polymer is thermosetting.

It is a disadvantage of the above-described transamidation process that it forms anionic (carboxylic) substituents in the polymer. These substituents are formed by the hydrolysis which a part of the amide substituents of the polyacrylamide undergo during the heating step. This hydrolysis decreases the concentration of reactive sites in the polymer and consequently decreases the efficiency of the polymer as wet-strengthening agent.

We have discovered thta polyacrylamide is soluble in the lower polyamines, and we have further found that a more efficient polymer is obtained when the transamidation is performed in such polyamines as the combined solvent and reactant, so that the reaction mixture contains substantially no water. In such process it is advantageous to employ a polyamine which has a boiling point in excess of about 80° C. so that the reaction can be made to proceed at a rapid pace by heating a solution of polyacrylamide in the polyamine without need for the use of pressure equipment. It is also advantageous to employ a large amount (5 to 15 times the stoichiometrical amount) of the polyamine; we have found that the presence of such a large amount of polyamine in the reaction mixture acts as a solvent for the starting and product polymers and suppresses the tendency of the product polymer to crosslink as it is formed, either with itself or with the polyacrylamide which is presently awaiting reaction with the polyamine. The occurrence of extensive cross-linking is undesirable when the polymer product is to be used as a wet-strengthening agent for paper, because it results in formation of a polymer which has an increased viscosity and a decreased cationic density.

After the anhydrous reaction which has just been described has proceeded to the desired extent (i.e., to the point where a polymer is formed which is water-soluble, cationic and thermosetting), economics requires that the unreacted (excess) polyamine present to be recovered. This may be done by vacuum distillation. We have found, however, that the polymer product can be selectively insolubilized, after which it can be removed in any convenient way, for example, filtration or centrifugation. The liquid residue is essentially the unreacted polyamine in the separatory liquid.

More in detail, we found it practical to recover the polymer product by introducing the reaction product into a volume of a liquid in which the polyamide is soluble but in which the polymer product is insoluble. In such liquid the polymer product precipitates rapidly and substantially completely and can be recovered in substantially pure form without difficulty by filtration followed by washing with a small amount of the separatory liquid. We have found isopropanol to be a particularly suitable separatory liquid. The filtrate is a solution of the polyamine in the liquid. When isopropanol is used as the separatory liquid, the residual polyamine, which it contains, can be generally recovered by distillation. The isopropanol distills, and the residual polyamine is then suitable for reuse.

We have further found that in the place of the large amount of polyamine described above there may be used an equal volume of a mixture of the polyamine with an organic selective solvent which is inert in the reaction. We have found that such solvents include ethylene glycol, propylene glycol, and diethylene glycol.

As has been stated, the parent starting material for the reaction may be polyacrylamide. It is possible, however, to employ in place of this material copolymers of acrylamide with minor amounts of vinyl compounds which are copolymerizable with acrylamide and which have no serious effect upon the water-solubility and ionic (electrostatic) sign of the polymer product to be produced. Thus in place of polyacrylamide there may be employed copolymers of 1 mol of acrylamide with up to about one-quarter of a mol of acrylonitrile, styrene and diallyldimethyl ammonium chloride.

The reaction of the parent polyacrylamide with the polyamine (or mixture of polyamines) is a complex one, and the course of this reaction has not been determined in detail. It is possible, for example, that during the reaction adjacent groups interreact and simultaneously react with the polyamine to form cyclic linkages such as the following:

(IV) 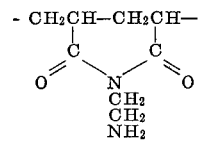

Moreover, the parent polyacrylamide may contain a minor proportion of carboxyl substituents, and in such event a part of the polyamine may be consumed by reaction with these carboxyl groups. As a result, it is not possible to define the polymer product in terms of its exact and ultimate molecular structure.

When the polymer is employed as a wet-strengthening agent in the manufacture of paper, best wet strength per unit weight of polymer is generally obtained when it is of comparatively low molecular weight (i.e., in the range of about 5,000–500,000).

When the polymer is used as a flocculating agent, best flocculation per unit weight of polymer is generally obtained when the polymer is prepared by the method disclosed and claimed in application of Nagy et al., Ser. No. 629,028 filed herewith.

Although the polyacrylamide-polyamine reaction product described above possesses very satisfactory thermosetting properties and passes into a tough gel stage when heated at moderate temperature (e.g., such as occurs during the normal drying of paper in a paper-making machine), we have found that the wet-strengthening properties of the reaction product are generally improved when the product polymer contains a reactive residue of a cross-linking agent. When the polymer is to be used in the manufacture of wet-strength paper, therefore, we prefer to react the polymer with a small amount of one or more of any of the customary agents used to render amine-containing polymers thermosetting, for example, ethylene dichloride, diglycidyl ether, and formaldehyde. The reaction is terminated before the polymer gels, so that reaction of the cross-linking agent is predominantly monofunctional and the polymer contains reactive residues of the cross-linking agent so that supplementary cross-linking is achieved when the polymer is subjected to elevated temperature such as occurs during the drying of the paper. Epichlorohydrin and epibromohydrin are preferred cross-linking agents because they react monofunctionally with polyamine rapidly and completely at low temperatures and because their bifunctional reaction proceeds rapidly during the paper-drying operation.

Epichlorohydrin has a major effect in improving the wet-strength properties of polymers of the present invention prepared from low (e.g., 20,000) molecular weight polyacrylamides, and in such instances improvements of 50% in wet tensile strength have been achieved.

Epichlorohydrin has a further major effect in that it eliminates need for accurate pH control during utilization of the polymer in paper-making. In the absence of epichlorohydrin the polymer produces best wet strength at almost exactly pH 7.0, and hence for best results this pH must be maintained accurately. The wet strength imparted by the polymer falls off as the pH is moved away from 7 into the acidic and basic ranges. However, when the polymer has a content of monofunctionally reacted epichlorohydrin, about the same wet strength is obtained at an alkaline pH as is obtained at pH 7, and a considerably less decrease in wet strength occurs when the polymer is employed at an acid pH than would otherwise be the case.

The effect of epichlorohydrin in extending the pH range over which the polymer is most efficiently employed is illustrated by the drawing which presents graphically the wet-strengthening properties of a typical polymer of the present invention (a cationic water-soluble thermosetting ethylenediamine-reacted polyacrylamide) without and with a reacted content of epichlorohydrin. The polymer was prepared by mixing polyacrylamide of a molecular weight of 60,000 with anhydrous ethylenediamine in 1:8 weight ratio, and heating the mixture for 4 hours at 90° C. The polymer was recovered by pouring the reaction mixture into six volumes of isopropanol, filtering off the polymer which precipitated, and washing the polymer with fresh isopropanol. The recovered polymer had an equivalent weight of 248 (by titration) and was water-soluble and strongly cationic. It set to an infusible and insoluble gel when heated for a few minutes at 100° C.

A part of this polymer was employed as beater additive in the manufacture of paper; 1% of the polymer based on the dry weight of the fibers was added as a 10% aqueous solution of pH 7 to each of three aliquots of bleached northern kraft pulp at a consistency of 0.6%. The aliquots were respectively adjusted to pH 6, 7, and 8, after which the aliquots were formed into handsheets at 50 lb. basis weight (25" x 40"/500 ream) by standard laboratory method, the sheets being dried for 1 minute on a drum drier having a drum temperature of 230° F.

A part of the parent resin was then reacted with 1.5 mols of epichlorohydrin per mol of ethylene diamine in the polymer by adding 1.5 mols of epichlorohydrin per mol of basic amino groups in the polymer (as determined by titration) with a 20% by weight aqueous solution of the polymer and maintaining the solution at 50° C. until the odor of epichlorohydrin had disappeared and the solution had started to increase in viscosity. Three sets of handsheets were made from these pulps under the same pH conditions and in the same manner as the first set of handsheets.

The results are plotted in the drawing. They show that when no epichlorohydrin was present in the polymer, the wet strength values obtained at pH 6 and 8 were respectively about 42% and 17% lower than the values obtained at pH 7. The drawing further shows that when epichlorohydrin was present in the polymer, the decrease in wet strength, which occurred when the polymer was used at pH 6, decreased by only about 16%, and that on the alkaline side a slight but perceptible increase occured.

The polymer of the present invention has great inherent strength, so small amounts of cross-linking agent (exemplified by epichlorohydrin) produce little improvement in its wet-strengthening action. In general, we find that the addition of 1 mol of epichlorohydrin per mol of basic amino groups present in the polymer is about the least which produces an economically worthwhile benefit, and that best results generally require the addition of 1.5 to 2 mols of epichlorohydrin on the same basis or even somewhat more.

The polymers of the present invention are employed as wet-strength agents for paper by the beater addition and tub sizing methods.

When employed according to the beater addition method, they are generally best added in the form of an approximately neutral aqueous solution to an approximately neutral pulp, at a point as near to the screen as convenient (for example, at the fan pump) so that the pH of the fibrous suspension as it is sheeted is about 6 to 8. The pulp may be composed of untreated cellulose fibers, or it may be composed of fibers which have previously been sized by addition of rosin size and alum.

The polymer develops very satisfactory wet strength when applied in amounts between 0.2% and 2% or more of the dry weight of the fibers and when the web is dried for ¼ to 3 minutes on rolls having a surface temperature of 190° F.–250° F., and evidently smaller and larger amounts may advantageously be used.

In the tub sizing method an aqueous solution is prepared at pH 7 containing a desired amount (typically 0.2%–2% or more by weight) of the polymer, and paper is immersed therein and dried as described. The resulting paper is heated to dry the fibers and to develop the wet-strengthening properties of the polymer thereon.

The polymer is employed as a fluocculant by gently mixing a dilute neutral solution of the polymer with a dilute neutral suspension of the suspension to be clarified. The optimum amount varies from instance to instance but is readily found by laboratory trial.

The invention will be further illustrated by the examples which follow. These examples are preferred embodiments of the invention and are not to be construed as limitations thereof.

EXAMPLE 1

The following illustrates the anhydrous preparation of a water-soluble cationic thermosetting vinyl polymer by transamidation of polyacrylamide with ethylenediamine.

A slurry of 50 g. (0.70 mol) of powdered polyacrylamide (molecular weight 20,000) in 225 g. (3.75 mol) of ethylenediamine is stirred for a few hours at 50° C. until clear and is then heated at 95° C. with stirring for 4¾ hours. The solution (which remains clear when heated to 105° C.) is cooled to 40° C., and the polymer is recovered by stirring the reaction mixture into six volumes of isopropanol, in which the unreacted monomer dissolves and in which the polymer is insoluble. The polymer is filtered off in the form of granules, which are vacuum-dried at room temperature.

The granules are friable and, when crushed, form a free-flowing powder. The powder is stable for at least several months at room temperature and is stable virtually indefinitely at 40° F., but thermosets to an insoluble gel when heated briefly at 100° C. It dissolves rapidly and completely in pure water at room temperature and also in water containing a small amount of epichlorohydrin. A 50% by weight solution of the polymer in water at room temperature is viscous but readily pumpable.

The polymer is composed of unsubstituted and substituted acrylamide units in approximately 2:1 molar ratio, as determined by titration. It has an equivalent weight of 270 per basic amino group, and thus is substantially composed of —$CH_2CH(CONH_2)$— and —$CH_2CH(CONHCH_2CH_2NH_2)$—

linkages in 2:1 molar ratio.

EXAMPLE 2

The following illustrates the preparation of a derivative of superior wet-strength properties by reaction of an aminoalkyl-substituted polyacrylamide with epichlorohydrin.

To a solution of 15 g. of the polymeric product of Example 1 in 65 ml. of water at room temperature is added with stirring 10.2 g. of epichlorohydrin (equivalent to 2.0 mols per mol of amine groups in the polymer). The temperature rises to 37° C. owing to the exothermic (monofunctional) reaction of the epichlorohydrin. When the reaction subsides, the mixture is warmed to 55° C. over 90 minutes during which it becomes a clear solution, and the solution is maintained at 60° C. until its viscosity has increased to M on the Gardner-Holdt scale, showing that a part of the epicholrohydrin reacted bifunctionally. The solution is cooled, diluted to 250 ml. with water, and acidified to pH 4 with a few drops of concentrated HCl.

The resulting solution is stable for at least three months.

EXAMPLE 3

The following illustrates the preparation in aqueous medium of a thermosetting polymer having similar wet-strengthening properties to that of Example 1.

To 75 g. of a 40% by weight (0.43 mol) solution of polyacrylamide (M.W. 15,000) in water at 20° C. is added with stirring 6.5 g. (0.108 mol) of ethylenediamine. The solution is kept at 25° C. until its Gardner-Holdt viscosity at 25° C. is Z-6. To the solution is added an equal weight of water. Half of the resulting mixture, acidified to pH 4.5 with hydrochloric acid (sample 3–A), is stable for several months. The remainder (sample 3–B) is kept without modification.

EXAMPLE 4

The following illustrates the reaction of the polyacrylamide-ethylenediamine polymer of Example 3 with epichlorohydrin.

To a portion of sample 3–B of Example 3 there is added with stirring 40.0 g. (0.86 mol) of epichlorohydrin in the absence of water. The temperature rises to 45° C. in five minutes and is held at that point by cooling. When the exotherm subsides, the reaction mixture is heated at 60° C. until its Gardner-Holdt viscosity at 60° C. is U, about five hours being required. The solution is diluted to 250 ml. with water, cooled to 20° C., and acidified to pH 4.5 with hydrochloric acid

EXAMPLE 5

The following illustrates the preparation of a series of cationic thermosetting polymers similar to that of Example 1 by transamidation of polyacrylamide with varying amounts of diethylenetriamine to form polymers substantially composed of —CH$_2$CH$_2$(CONH$_2$)— and —CH$_2$CH$_2$(CONHCH$_2$CH$_2$NHCH$_2$CH$_2$NH$_2$)— linkages in different proportions.

A mixture of 100 g. (1.43 mol) of polyacrylamide (M.W. 5,000–10,000) and 500 ml. of diethylenetriamine (4.8 mol) is heated to 110° C. and 25 ml. of water is added which converts the two-phase mixture to a solution. The solution is maintained at 110° C. and samples are removed after two, three, and four hours. The polymer is recovered from each of the three samples by adding one volume of the solution to six volumes of isopropyl alcohol and recovering the polymer by filtration. The polymers have respectively equivalent weights of 266, 246, and 220 per basic site, which indicates that the molar ratios of unsubstituted amide substituents to basically substituted amide substituents are about 5:1.

EXAMPLE 6

The following illustrates beneficiation of the polymer of Example 5 by reaction with a cross-linking agent.

Ten grams of the sample of the three-hour reaction product of Example 5 (having an equivalent weight of 246) is dissolved in 48 ml. of water. To this is added with stirring 4.8 ml. of epichlorohydrin (5.6 g., equivalent to 1.5 mols per mol of amine in the polymer). The mixture is stirred at room temperature until all the epichlorohydrin has dissolved. The solution is then heated at 50° C. for about 35 minutes, until its Gardner-Holdt viscosity is P at 50° C. The solution is then diluted with water to 10% solids, acidified to pH 4.5 with HCl, and cooled to room temperature.

EXAMPLE 7

The following illustrates the preparation of a polymer similar to that of Example 1 by transamidation of polyacrylamide with 3,3' - (m - phenylenedioxy)bispropylamine (prepared by condensation of acrylonitrile with resorcinol). The transamidation is performed by heating a solution of 1 mol of polyacrylamide in ethylene glycol at 90° C. with 1.0 mol of the amine until 0.25 mol of ammonia has been evolved. The polymer may be employed for most purposes as prepared, without removal of the glycol.

EXAMPLE 8

The following illustrates the preparation of a polymer similar to that of Example 1 by transamidation of polyacrylamide with 2,2'-oxybispropylamine. The polymer is substantially composed of —CH$_2$CH(CONH$_2$)— units,

—CH$_2$CH(CONHCH$_2$CH$_2$CH$_2$OCH$_2$CH$_2$CH$_2$NH)$_2$— units, self-condensation products thereof, and acrylic acid units.

To 200 g. of a 40% by weight aqueous solution of polyacrylamide (1.13 mol, M.W. 5,000–10,000) is added 37.0 (0.28 mol) of 3,3'-oxybispropylamine. The solution is heated for 3 hours at 60° C. and is then diluted with an equal weight of water and divided into two portions. One of the portions (Sample 8–A) is adjusted to pH 4.0 with concentrated HCl and is stable for 3 months. The remaining portion (sample 8–B) is left untreated.

EXAMPLE 9

The following illustrates the beneficiation of the polymer of Example 8 by reaction with a cross-linking agent.

To the unneutralized solution of Example 8 (sample 8–B) at room temperature is added 51.8 g. (0.56 mol of epichlorohydrin). After the exothermic reaction subsides the solution is maintained at 60° C. for 4 hours, during which time the viscosity of the solution increases substantially. The reaction mixture is diluted with water to 1100 g. (10% resin solids) and is acidified to pH 4.5 with concentrated hydrochloric acid.

EXAMPLE 10

The following illustrates the preparation of a polymer similar to that of Example 1 by transamidation of polyacrylamide with 2,2' - (N,N'-piperazinylidene)bisethylamine. The procedure of Example 7 is followed. The polymer is substantially composed of

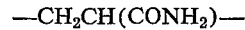

and

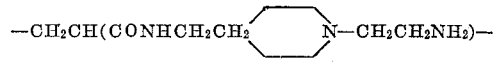

linkages (or self-condensation products thereof).

EXAMPLE 11

The following illustrates the preparation of a polymer similar to that of Example 1 by transamidation of polyacrylamide with 1,3-diamino-2-propanol (prepared by reaction of epichlorohydrin with ammonia).

To 100 g. of molten 1,3-diamino-2-propanol is added 25 g. of polyacrylamide (M.W. 5–10,000). The resultant solution is heated at 85°–90° C. for eight hours and is then cooled and poured into 1000 g. of isopropanol. The polymer precipitates and and is recovered by filtration. It is composed essentially of —CH$_2$CH(CONH$_2$)— and —CH$_2$CH(CONHCH$_2$CHONCH$_2$NH$_2$)— linkages.

EXAMPLE 12

A 15-g. portion of the polymer of Example 11 is dissolved in 120 g. of deionized water, and to the solution is added 15 g. of epichlorohydrin with stirring at room temperature. The epichlorohydrin dissolves in 15 minutes, and the viscosity of the solution is A-3 on the Gardner-Holdt scale. In 6 hours at room temperature the viscosity increases to C on the Gardner-Holdt scale. The solution is diluted with 150 g. of water and acidified to pH 4.3 with hydrochloric acid.

EXAMPLE 13

The following illustrates the manufacture of wet-strength paper by the use of typical resins of the present invention.

Bleached northern softwood (kraft) pulp is beaten to a Canadian standard freeness of 400 ml. and adjusted to pH 7.0 at 0.6% consistency. To aliquots of this pulp are added aqueous solutions of the present invention indicated in the table below in the amounts shown, after which the aliquots are again adjusted to pH 7.0. The aliquots are formed into hand-sheets having a basis weight of approximately 50 lbs. per 25" x 40"/500 ream. The handsheets are dried for 1 minute on a rotary laboratory drum drier having a drum temperature of 230° F., which is sufficient to thermoset the polymer and develop a major part of the wet-strength properties of the resin in the handsheets.

The handsheets are conditioned for 24 hours at 73° F. and 50% relative humidity, and the wet tensile strength of the sheets is determined by standard TAPPI method.

Results are as follows:

| Example | Resin components [1] | Percent added to pulp [4] | Strength (lb./in.)[5] |
|---|---|---|---|
| 1 | PAM-EDA [2] | 1.0 | 5.5 |
| 2 | PAM-EDA-Epi [2] | 1.0 | 8.3 |
| 3 | PAM-EDA [3] | 1.0 | 4.0 |
| 4 | PAM-EDA-Epi [3] | 1.0 | 5.4 |
| 5 | PAM-DETA [3] | 1.0 | 4.35 |
| 6 | PAM-DETA Epi [3] | 1.0 | 5.35 |
| 12 | PAM-DAP-Epi [2] | 1.0 | [6] 3.9 |

[1] PAM=polyacrylamide; EDA=ethylenediamine; Epi=Epichlorohydrin; DAP=1,3-diamino-2-propanol.
[2] PAM-polyamine reaction performed in absence of water (excess polyamine used as solvent).
[3] PAM-polyamine reaction performed in presence of water.
[4] Polymer solids based on dry weight of the fibers.
[5] Adjusted to a basis weight of 50 lb. per 25" x 40"/500 ream.
[6] Polymer tested on 50:50 hardwood: softwood pulp.

EXAMPLE 14

The following illustrates the wet strength achieved by different amounts of the polymer. The polymers of Example 1 (containing no epichlorohydrin) and of Example 2 (containing epichlorohydrin) are used, and the method of Example 13 is repeated except that the amounts of the polymer are varied as is shown in the table below. Results are as follows:

| Example | Percent polymer added [1] | Paper wet strength [2] (lb./in.) |
|---|---|---|
| 1 | 0.25 | 4.5 |
| 1 | 0.50 | 5.9 |
| 1 | 1.0 | 6.3 |
| 2 | 0.25 | 3.5 |
| 2 | 0.50 | 5.9 |
| 2 | 1.0 | 7.8 |

[1] Based on dry weight of the fibers.
[2] Adjusted to basis weight of 50 lb. per 24" x 40"/500 ream.

EXAMPLE 15

The following illustrates the comparative effect as wet-strengthening agent of the water-soluble condensates formed by reacting the polymer of Example 1 with increasing amounts of epichlorohydrin. The reaction is performed as shown in Example 2, and the resulting polymers are tested by the method of Example 13 at the uniform level of 1.0% of polymer based on the dry weight of the fibers, the pH of the pulp being adjusted to 7.0 before and after addition of the polymer.

Results are as follows:

| M.W. of starting PAM | Amine equiv. wt. | Wet strength, lb./in. | Mols epi added | Wet strength, lb./in. |
|---|---|---|---|---|
| 45,000 | 265 | 5.9 | 1.5 | 7.4 |
| | | | 2.0 | 7.55 |
| | | | 2.5 | 7.55 |
| 17,500 | 322 | 5.75 | 1.2 | 5.25 |
| | | | 2.0 | 5.95 |
| | | | 2.5 | 6.0 |

EXAMPLE 16

The following illustrates the effectiveness of the polymer of the present invention as a water-based cement for porous surfaces.

5 g. of the powdery product of Example 1 is dissolved in 5 g. of water at room temperature. The powder dissolves almost instantly with formation of a clear amber syrup.

The syrup is used to cement two pieces of white pine wood (each 3½" x 1¼" x ⅝") together. After 4 hours at 120° F. and 12 hours at 70° F., the pieces are bonded so strongly that they cannot be separated by pulling them apart or by twisting them by hand.

The procedure is repeated using two pieces of paper, which are placed under light pressure for 5 minutes in a laboratory oven having an interior temperature of 116° C. After 5 minutes the pieces are so strongly bonded together that they cannot be separated without breaking the internal (i.e., fiber-fiber) bonds of the paper.

EXAMPLE 17

5 g. of the powdery product of Example 1 is dissolved in a solution of 1 g. of epichlorohydrin in 5 g. of water. The resulting syrup possesses about the same adhesiveness as the syrup of Example 16, but sets much more rapidly.

EXAMPLE 18

The following illustrates the preparation of high molecular weight polymers specially suited for use on flocculating agents for solids in aqueous suspension. The method is claimed in Nagy et al. application Ser. No. 629,028 filed herewith.

In a round-bottomed flask fitted with thermometer, stirrer and electric heating mantle are placed 40 g. (0.57 mol) of polyacrylamide and 800 g. (13.3 mol) of ethylenediamine. The polyacrylamide has a molecular weight of 120,000; it is composed of acrylamide and acrylic acid linkages in 98:2 molar ratio. Both reagents contain 1% by weight of water. The mixture is heated to 67° C. to form the reagents into a solution; the solution is a mobile liquid having a viscosity of about 3 poises.

The temperature of the mixture is gradually and almost uniformly raised over 42 hours to 97° C., so that the mixture remains a single phase (i.e., a uniform solution) during all of the heating. Formation of two phases can readily be detected by eye. The rate of heating is slowed when a second phase begins to appear, thereby causing the second phase to disappear.

Heating is terminated when (as determined from a pilot run) the polymer is just short of the point at which it becomes water-insoluble. The mixture is then cooled and the polymer is recovered by pouring one part of the mixture into six parts of isopropyl alcohol, and recovering the polymer by filtration.

We claim:
1. A water-soluble cationic thermosetting vinyl polymer, resistant to hydrolysis, consisting essentially of water-soluble carbon chains 20 to 90 mol percent composed of N-unsubstituted acrylamide linkages and 80 to 10 mol percent composed of cationic N-substituted acrylamide linkages of the theoretical formula

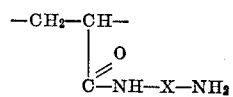

wherein X represents a non-anionic linkage containing 2 to 10 carbon atoms.

2. A polymer according to claim 1 having a molecular weight in the range of about 5,000–500,000.

3. A polymer according to claim 1 wherein X represents $-CH_2CH_2-$.

4. A polymer according to claim 1 wherein X represents $-(CH_2CH_2-NH)_{1-4}CH_2CH_2-$.

5. A polymer according to claim 1 in dry particulate state.

6. A water-soluble condensate of a polymer according to claim 1 with 1 to 2 mols of epichlorohydrin per amino group therein.

7. Wet-strength paper composed of water-laid cellulose fibers bonded together by a uniformly adsorbed content of a polymer according to claim 1 in thermoset state.

8. A process for the preparation of a water-soluble cationic vinyl polymer of claim 1 which comprises transamidating a hydrophilic water-dispersible vinyl polymer having a molecular weight less than 500,000 containing at least 20 mol percent of N-unsubstituted acrylamide linkages with an amine of the formula $NH_2-X-NH_2$, wherein X represents a non-anionic linkage containing 2 to 10 carbon atoms, by heating said polymer in the presence of a stoichiometric excess of said amine, until the polymer has a content of at least 10 mol percent of substituents of the formula $-NH-X-NH_2$.

9. A process according to claim 8 wherein the transamidation is performed in the substantial absence of water.

10. A process according to claim 9 wherein the amine is ethylenediamine.

References Cited

UNITED STATES PATENTS

| 2,486,192 | 10/1949 | Minsk et al. | 260—89.7 |
| 3,159,612 | 12/1964 | Tson et al. | 260—89.7 |
| 3,170,901 | 2/1965 | Melamed et al. | 260—89.7 |
| 3,255,072 | 6/1966 | Sheetz et al. | 260—89.7 XR |

FOREIGN PATENTS

| 896,967 | 6/1962 | Great Britain. |

JOSEPH L. SCHOFER, Primary Examiner

W. F. HAMROCK, Assistant Examiner

U.S. Cl. X.R.

162—168; 210—54

UNITED STATES PATENT OFFICE
CERTIFICATE OF CORRECTION

Patent No. 3,507,847      Dated April 21, 1970

Inventor(s) Laurence Lyman Williams and Anthony Thomas Coscia

It is certified that error appears in the above-identified patent and that said Letters Patent are hereby corrected as shown below:

Column 8, line 21, "$-CH_2CH(CONHCH_2CH_2CH_2OCH_2CH_2CH_2NH)_2-$" should read -- $-CH_2CH(CONHCH_2CH_2CH_2OCH_2CH_2CH_2NH_2)-$ --.

Column 8, line 55, "$-CH_2CH(CONHCH_2CH_2$ 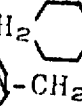 $N-CH_2CH_2NH_2)-$" should read -- $-CH_2CH(CONHCH_2CH_2N$  $N-CH_2CH_2NH_2)-$ --.

Column 8, line 70, "$-CH_2CH(CONHCH_2CHONCH_2NH_2)-$" should read -- $-CH_2CH(CONHCH_2CHOHCH_2NH_2)-$ --.

Column 9, line 31, "Strength (lb./in.)$^5$" should read -- Paper Wet Strength (lb./in.)$^5$ --.

SIGNED AND SEALED

SEP 29 1970

(SEAL)
Attest:

Edward M. Fletcher, Jr.
Attesting Officer

WILLIAM E. SCHUYLER, JR.
Commissioner of Patents